US009059757B2

(12) United States Patent
Ji et al.

(10) Patent No.: US 9,059,757 B2
(45) Date of Patent: Jun. 16, 2015

(54) COMMUNICATION METHOD AND APPARATUS FOR USE IN MULTIPLE ANTENNA SYSTEM

(71) Applicants: Samsung Electronics Co., Ltd., Gyeonggi-do (KR); Industry-Academic Cooperation Foundation, Yonsei University, Seoul (KR)

(72) Inventors: Hyoungju Ji, Seoul (KR); Chanbyoung Chae, Gyeonggi-do (KR); Younsun Kim, Gyeonggi-do (KR); Juho Lee, Gyeonggi-do (KR); Hyojin Lee, Gyeonggi-do (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 14/201,651

(22) Filed: Mar. 7, 2014

(65) Prior Publication Data

US 2014/0254703 A1    Sep. 11, 2014

(30) Foreign Application Priority Data

Mar. 8, 2013    (KR) .......................... 10-2013-0025313

(51) Int. Cl.
*H04B 7/02* (2006.01)
*H04B 7/04* (2006.01)
*H04B 7/06* (2006.01)

(52) U.S. Cl.
CPC ............ *H04B 7/0456* (2013.01); *H04B 7/0617* (2013.01); *H04B 7/0619* (2013.01); *H04B 7/0639* (2013.01)

(58) Field of Classification Search
None
See application file for complete search history.

(56) References Cited

U.S. PATENT DOCUMENTS

2010/0238824 A1*   9/2010   Farajidana et al. ........... 370/252
2014/0098900 A1*   4/2014   Bayesteh et al. .............. 375/267

* cited by examiner

*Primary Examiner* — Adolf Dsouza (57) ABSTRACT

A method and apparatus for transmitting and receiving signals is provided for use in a codebook-based closed-loop multiple antenna system. A method for receiving signals in a codebook-based multiple antenna system according to the present disclosure includes estimating a desired signal and an interference channel, determining a codebook index using the desired channel, a Hermitian of the desired channel, and the interference channel, and feeding back the codebook index to a transmitter. The multi-antenna system of the present disclosure is advantageous in suppressing the interference from other cells and maximizing the gain of the desired signal especially when the number of receive antennas is greater than the reception streams and in designing a codebook with high performance as compared to the Grassmanian codebook and low complexity.

10 Claims, 10 Drawing Sheets

COMMUNICATION METHOD AND APPARATUS FOR USE IN MULTIPLE ANTENNA SYSTEM

CROSS-REFERENCE TO RELATED APPLICATION(S) AND CLAIM OF PRIORITY

The present application is related to and claims the benefit under 35 U S. C. §119 a of a Korean patent application No. 10-2013-0025313 filed in the Korean Intellectual Property Office on Mar. 8, 2013, and the entire disclosure of which is hereby incorporated by reference.

TECHNICAL FIELD

The present disclosure relates to a method and apparatus for transmitting and receiving signals in a codebook-based closed-loop multiple antenna system.

BACKGROUND

Recently, many researches are being conducted on Multiple Input Multiple Out (MIMO) system using spatial resource for transmitting high quality data at high data rate in a wireless communication environment.

The MIMO system can be classified into one of Single-User MIMO using the given time-frequency resource for one user entirely and a Multi-User MIMO (MU-MIMO) using the given time-frequency resource for multiple users in common through spatial multiplexing.

In the current $3^{rd}$ Generation Project Partnership Long Term Evolution (3GPP LTE) downlink communication mode, the base station transmits the data precoded with a unitary matrix based on Precoding Matrix Index (PMI), Channel Quality Indicator (CQI), and Rank Indicator (RI) reported by terminals.

In the 3GPP LTE downlink communication mode, the terminal determines the PMI, CQI, and RI based on the current channel state and received signal quality level and feeds back the PMI, CQI, and RI.

In the conventional SU-MIMO system, the researches has been focused on the case where the number of receive antennas is identical with the number of transmission streams. In the SU-MIMO, a best match candidate selected in the codebook, particularly Grassmanian codebook, is transmitted to the transmitter to decrease transmission error rate and increase transmission throughput. The Grassmaniann codebook makes it possible to achieve the highest performance in SU-MIMO logically.

In the case of MU-MIMO, if the transmitter does not know the accurate channel information, it is difficult to achieve maximum multiplexing gain due to the inter-user interference. Since it is difficult for the base station to acquire accurate channel information, the codebook-based MU-MIMO technology is still used. The Grassmanian codebook or orthogonal codebook is of being used usually.

The orthogonal codebook is characterized in that the candidate vectors are not correlated as far as possible as thus shows good performance as the number of candidate users increases even with its design without reflecting channel characteristic The Grassmanian codebook is characterized in that the channel is quantized by in the way of feedback of the candidate vector closest to the channel direction in itself. In the case that the number of candidate users is not so many, the Grassmanian codebook may show the better performance as compared to the orthogonal codebook but also has a drawback in that it is difficult to form a codebook of a certain size.

The SU-MIMO or MU-MIMO allocates the time-frequency resource to one user or multiple users within a cell. Also, the studies on the resource allocation for multi-cell environment have been conducted separately. The multi-cell MIMO is being discussed in 3GPP along with joint processing technology, coordinated beamforming technology, and the like. These technologies are being studied in consideration of transmitting user-specific messages.

However, the multi-cell technology is designed mainly based on the Grassmanian codebook and orthogonal codebook still with the focus on the case where the number of receive antennas are equal to the number of streams. In the case that the number of receive antennas is greater than the number of streams, this requires optimization of the transceiver as such and iteration in the normal situation and risks divergence at times.

SUMMARY

To address the above-discussed deficiencies, it is a primary object to provide a communication method and apparatus capable of removing interference from other cells and maximizing signal gain of the desired signal especially when the number of receive antennas of the terminal is greater than the reception streams.

Also, the present disclosure aims to provide a communication method and apparatus that is capable of processing common and terminal-specific messages received from a multi-antenna transmitter.

Also, the present disclosure aims to provide a communication method and apparatus that is capable of designing a codebook promising high performance as compared to the Grassmanian codebook and having low complexity.

The objects of the present disclosure are not limited to the aforesaid, and other objects not described herein with be clearly understood by those skilled in the art from the descriptions below.

In accordance with an aspect of the present disclosure, a method for receiving signals in a codebook-based multiple antenna system is provided. The method includes estimating a desired signal and an interference channel, determining a codebook index using the desired channel, a Hermitian of the desired channel, and the interference channel, and feeding back the codebook index to a transmitter.

In accordance with another aspect of the present disclosure, a method for transmitting a signal in a codebook-based multiple antenna system is provided. The method includes receiving a codebook index from a receiver, calculating a user-specific message beamforming vector and common message beamforming vector from the codebook index, and transmitting the data as multiplied with the user-specific beamforming vector and the common message beamforming vector with the data.

In accordance with another aspect of the present disclosure, an apparatus for a codebook-based multiple transmission and/or reception is provided. The apparatus includes a plurality of antennas configured to transmit and/or receive a signal, and a controller configured to estimate a desired channel and an interference channel, determine a codebook index using the desired channel a Hermitian of the desired channel and the interference channel, and feed back the codebook index to a transmitter. The controller can be configured to determine the codebook index using a first product between the Hermitian of the desired channel and the desired channel and a second product between the Hermitian of the desired channel and the interference channel. The controller can be further configured to calculate a user-specific message reception filter and a common message reception filter using the Hermitian of the desired channel and the interference channel. The apparatus can include a reception filter configured to filter a user-specific message and a common message from the data transmitted by the transmitter. The controller can be further configured to estimate a user-specific message beamforming vector and a common message beamforming vector and calculate a user-specific message reception filter and a common message reception filter using the user-specific message beamforming vector and the common message beamforming vector.

In accordance with another aspect of the present disclosure, an apparatus for a codebook-based multiple transmission and/or reception is provided. The apparatus includes a controller configured to receives a codebook index from a receiver and calculate a user-specific message beamforming vector and common message beamforming vector from the codebook index, a beamformer configured to transmit the data as multiplied with the user-specific beamforming vector and the common message beamforming vector with the data. The controller can be further configured to generate a first product between a Hermitian of the desired channel and a second product between a Hermitian of the desired channel and an interference channel, and calculate a user-specific message beamforming vector and a common message beamforming vector using the first product between the Hermitian of the desired channel and the desired channel and the second product between the Hermitian of the desired channel and the interference channel.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications technologies. Detailed description of well-known functions and structures incorporated herein may be omitted to avoid obscuring the subject matter of the present disclosure. Exemplary embodiments of the present disclosure are described with reference to the accompanying drawings in detail. Further, the following terms are defined in consideration of the functionality in the present disclosure, and may vary according to the intention of a user or an operator, usage, etc. Therefore, the definition should be made on the basis of the overall content of the present specification.

The transceiver according to an embodiment of the present disclosure uses a plurality of antennas, and a plurality of transmitters transmits the common messages (addressed to unspecified plural users) and user-specific messages (addressed to individual users). The transmitter receives a codebook limited in size from the receiver for use in transmission scheme calculation.

Figure 1:
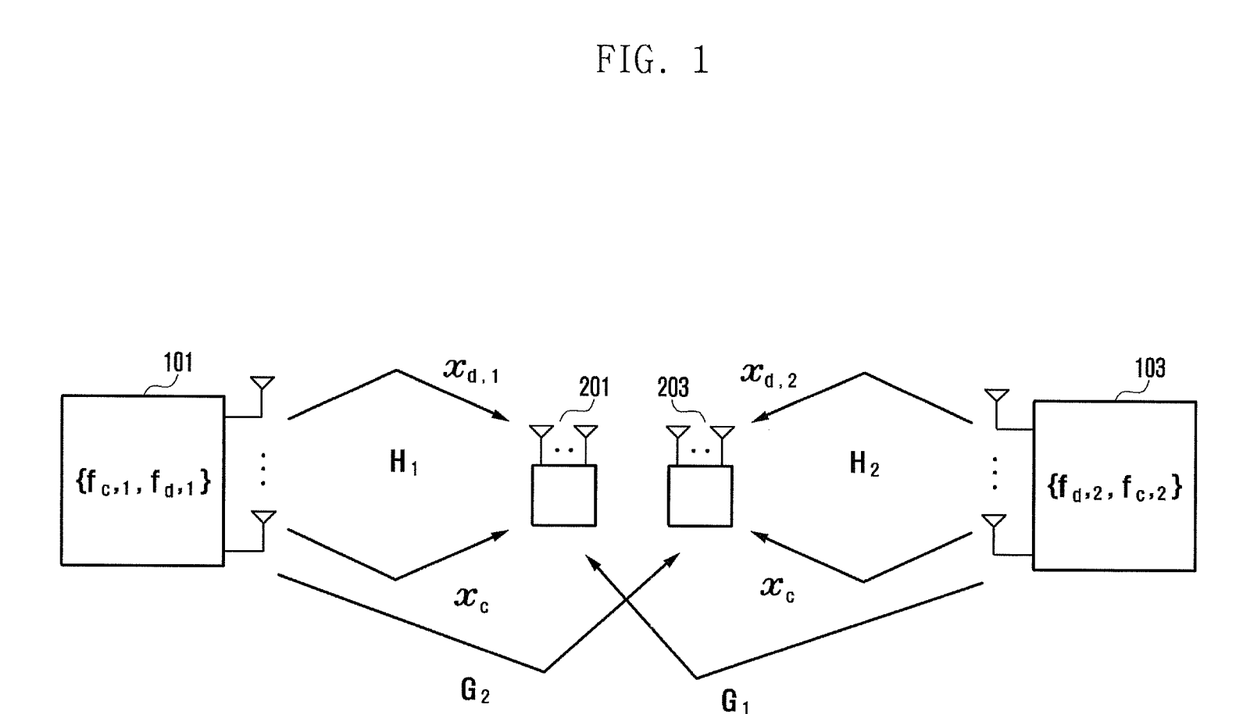
FIG. 1 is a diagram exemplifying a communication system according to an embodiment of the present disclosure.

FIG. 1 is a diagram exemplifying a communication system according to an embodiment of the present disclosure.

Referring to FIG. 1, the communication system includes at least two transmitters 101 and 103 which may transmit user specific message xd and common message xc to at least two receiver 201 and 203. Here, H1 is the channel between the first transmitter 101 and the first receiver 201, and H2 is the channel between the second transmitter 103 and the second receiver 203. The channel between the first transmitter 101 and the second receiver 203 is denoted by G2, and the channel between the second transmitter 102 and the first receiver 201 is denoted by G1. Although the drawing shows two transmitters and two receivers, the system may be embodied with more transmitters and receivers forming the channels therebetween that are denoted by Hk and Gk in general.

Figure 2:
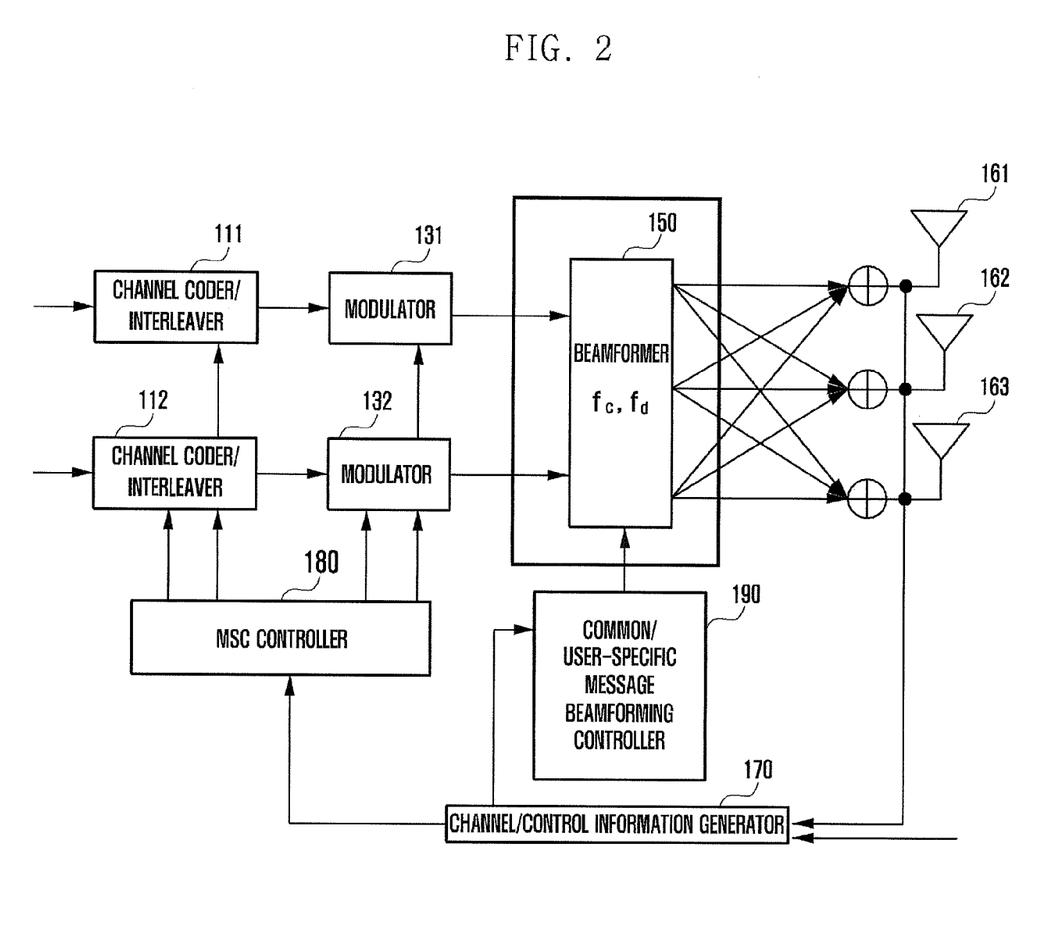
FIG. 2 is a block diagram illustrating a configuration of the transmitter according to an embodiment of the present disclosure.

FIG. 2 is a block diagram illustrating a configuration of the transmitter according to an embodiment of the present disclosure.

Referring to FIG. 2, the transmitter 100 according to an embodiment of the present disclosure includes channel coders/interleavers 111 and 112 modulators 131 and 132, a beamformer 150, an MCS controller 180, a common/user-specific beamforming controller 190, a channel/control information generator 170, and transmit antennas 161, 162, and 163.

The transmitter 100 may send a receiver the user-specific message xd and the common message xc. At this time, the beamformer 150 multiplies an fd beamforming vector as the user-specific beamforming vector with the user-specific message xd and an fc beamforming vector as the common message beamforming vector with the common message xc, the beamforming results being sent to a plurality of transmit antennas 161, 162, and 163. Although three transmit antennas 161, 162, and 163 are depicted in the drawing, two, four, or more antennas may be used.

The common/user-specific message beamforming controller 190 calculates the $f_d$ beamforming vector for the user-specific message xd of the beamformer 150 and the $f_c$ beamforming vector for the common message xc based on the channel information feedback from the terminal 200. According to an embodiment of the present disclosure, the $f_c$ beamforming vector and $f_d$ beamforming vector may be calculated as follows. The $f_d$ beamforming vector for transmitting the common message xd carrying common information for plural users can be calculated using a generalized eigenvector of $H^*_k G_l G^*_k H_l$. The fc beamforming vector for transmitting the user-specific message xc can be calculated using the generalized eigenvector of A B. At this time, A and B are defined as follows:

$$A = (f^*_{d,k} H^*_k H_k)^{-1} (f^*_{d,k} H^*_k G_l)$$

$$B = (f^*_{d,l} H^*_l H_l)^{-1} (f^*_{d,l} H^*_l G_k)$$

Figure 3:
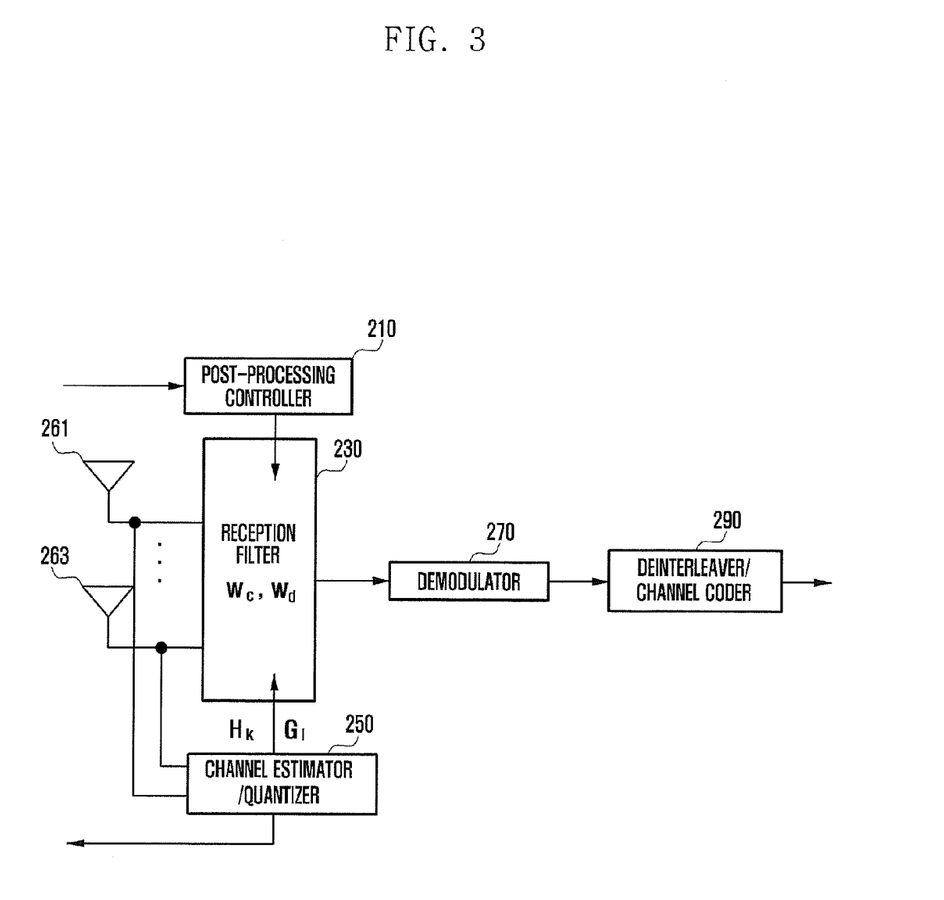
FIG. 3 is a block diagram illustrating a configuration of the receiver according to an embodiment of the present disclosure.

The channel/control information generator 170 reconfigures the channel based on the feedback information from the terminal or receiver 200. The operation of channel/control information generator 170 is described in association with the channel estimator/quantizer 250 of the receiver 200.

Since the channel coder/interleaver 111 and 112, the modulator 131 and 132, and the MCS controller 180 operate in the similar way to the channel coder/interleaver, modulator, MCS controller of the conventional transmitter, detailed descriptions thereon are omitted herein.

FIG. 3 is a block diagram illustrating a configuration of the receiver according to an embodiment of the present disclosure.

Referring to FIG. 3, the receiver 200 according to an embodiment of the present disclosure includes a post-processing controller 210, a reception filter 230, a channel estimator/quantizer 250, a demodulator 270, a deinterleaver/channel decoder 290, and receive antennas 261 and 262.

The post-processing controller 210 calculates a reception filter necessary for reception post-processing operation. In an embodiment of the present disclosure, since the number of receive antennas is greater than the number of reception streams, separate combing operation is required, and the user-specific and common message reception filters are calculated using the downlink channel value. The operation can be exemplified as follows:

User-specific message reception filter:

$$w_{d,k} = \frac{H_k f_{d,k}}{\|H_k f_{d,k}\|}$$

Common message reception filter:

$$w_{c,k} = \frac{\alpha H_k f_{c,k} + \beta G_l f_{c,l}}{\|\alpha H_k f_{c,k} + \beta G_l f_{c,l}\|},$$

where alpha and beta denotes the weight constants.

The reception filter 230 discriminates between the user-specific message xd and the common message xc by applying Wd and Wc calculated by the post-processing controller 210 to the received signal.

The channel estimator/quantizer 250 estimates the desired channel H and interference channel G of the downlink signal and sends the transmitter 100 the quantized information. The channel estimator/quantizer 250 uses a new method different form the conventional Grassmanian codebook and orthogonal codebook. The channel estimator/quantizer 250 quantizes the Hermitian version of the desired signal, i.e. $H^*_k H_k$, and a mixed version of the desired signal and interference signal, i.e. $H^*_k G_l$, other than feeding back the desired signal H. Since the product between the two matrices is fed back without quantization of H and G themselves, each item of the mixed version is scalar-quantized. In the case of Rayleigh channel, each item is beta-distributed with parameters (number of antennas and (number of transmit antennas−1)*number of reception antennas). Unlike the conventional method using the Grassmanian codebook or orthogonal codebook, the scalar having a value in the range of −0.5~0.5 designed newly is fed back to the transmitter.

Since the demodulator 270 and the deinterleaver/channel decoder 290 operate in the similar way to the demodulator and deinterleaver/channel decoder of the receive abiding by the conventional technology, detailed descriptions thereon are omitted herein.

The configurations of the transmitter and receiver according to an embodiment of the present disclosure have been described hereinabove.

Descriptions are made of the operations of the transmitter and the receiver according to an embodiment of the present disclosure hereinafter.

The operations of the transmitter 100 and the receiver 200 according to an embodiment of the present disclosure may be exemplified as follows. Once communication starts, the transmitter transmits control information including a number of transmit antennas to the receiver 200, and the receiver 200 transmits the control information including a number of receive antennas to the transmitter 100. Afterward, the terminal or receiver 200 estimates interference channel to the desired channel in downlink and determines a codebook index based on the estimation result, and feeds back the selected codebook index to the transmitter 100. The transmitter 100 receives the codebook index and transmits the data with the beamforming vector calculated based on the codebook index, and the receiver 200 calculates the reception vector to receive the common message and the user-specific message.

Figure 4:
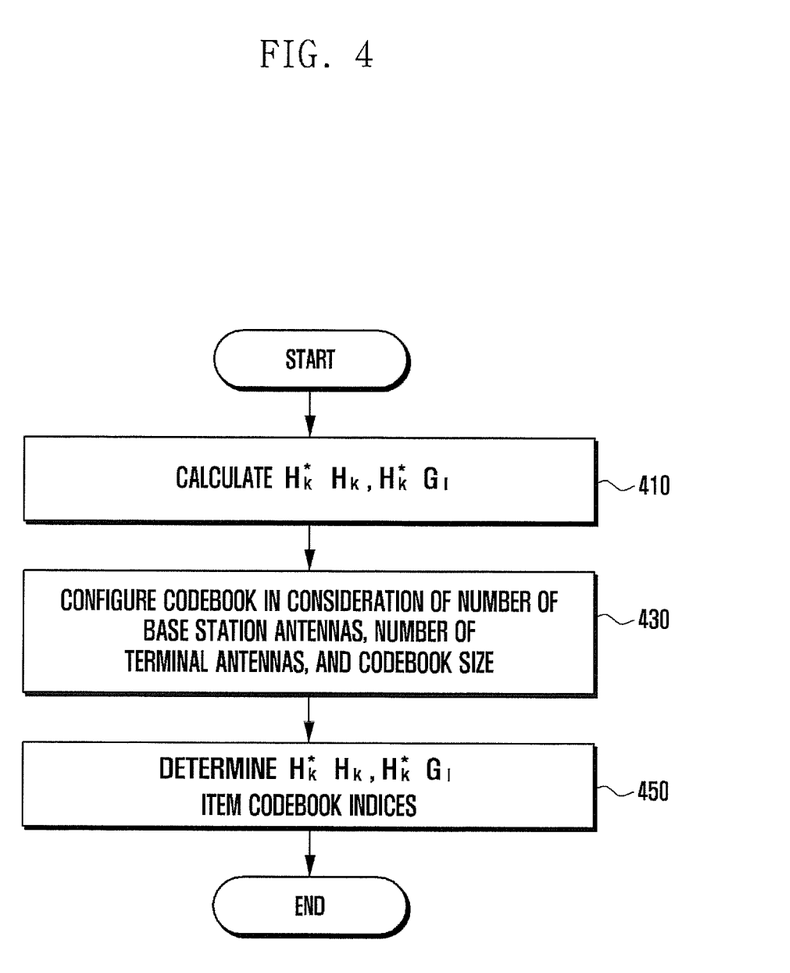
FIG. 4 is a flowchart illustrating a procedure of configuring a codebook index at the receiver according to an embodiment of the present disclosure.

FIG. 4 is a flowchart illustrating a procedure of configuring a codebook index at the receiver according to an embodiment of the present disclosure.

Referring to FIG. 4, the receiver 200 or reception terminal estimates the channel with the corresponding base station or transmitter 100, i.e. $H_k$ and the channel with the neighbor interferer base station, i.e. $G_l$, by means of the channel estimator/quantizer 250 at operation 410. The receiver 200 may calculate $H^*_k H_k$ and $H^*_k G_l$ with estimated $H_k$ and $G_l$. The receiver may form a codebook in consideration of the codebook size reflecting a number of transmit antennas of the base station that can be received from the base station through the control channel, a number of receive antennas of the terminal, the feedback channel size for exchanging channel information between the base station and the terminal at operation 430. The codebook may be calculated once based on the system information in use of the system and used repeatedly in data transmission afterward. Whenever the number of terminals changes or the number of transmit antennas changes, the codebook may be re-calculated depending on the situation. Finally, the receiver 200 feeds back the scalar-quantized value $H^*_k H_k$ calculated using the channel quantization method and the codebook index of $H^*_k G_l$ item to the base station at operation 450.

Figure 5:
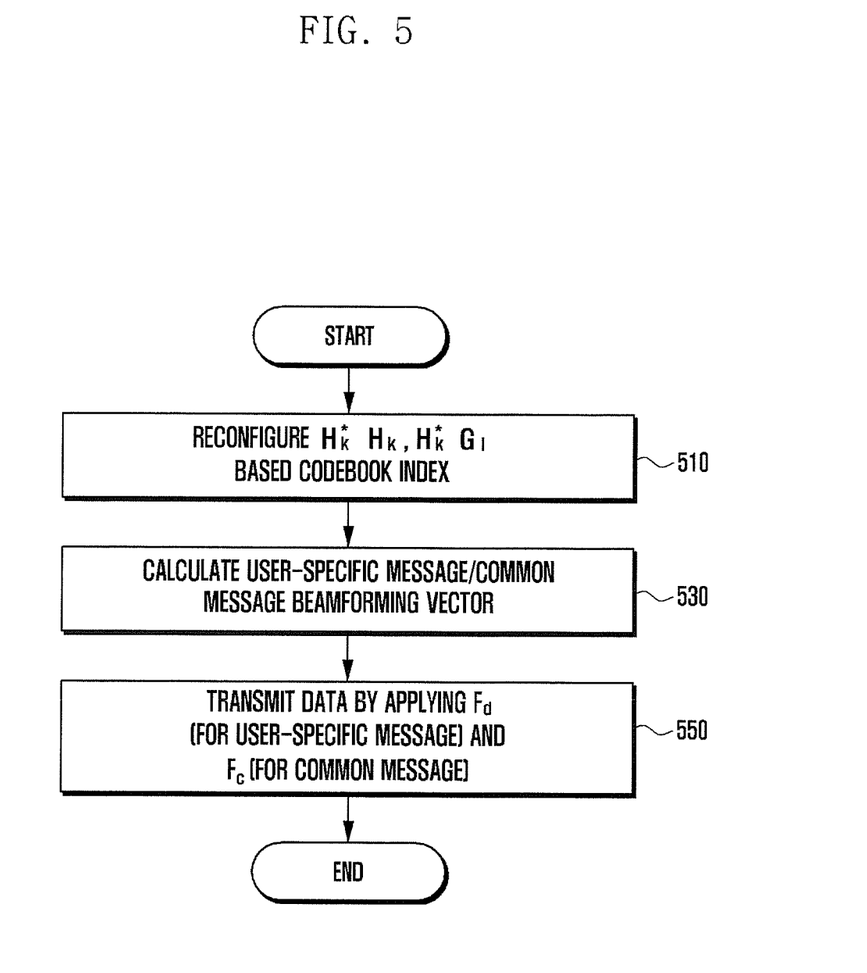
FIG. 5 is a flowchart illustrating a data transmission procedure of the transmitter according to an embodiment of the present disclosure.

FIG. 5 is a flowchart illustrating a data transmission procedure of the transmitter according to an embodiment of the present disclosure.

Referring to FIG. 5, the transmitter 100 according to an embodiment of the present disclosure may receive the codebook index of $H^*_k H_k$ and $H^*_k G_l$ items fed back by the receiver 200 at operation 450 of FIG. 4. The transmitter 100 reconfigures $H^*_k H_k$ and $H^*_k G_l$ using the code book stored in the base station 100 based on the feedback value received from the receiver 200 at operation 510. Afterward, the base station 100 calculates the $f_d$ beamforming vector for user-specific message and fc beamforming vector for common message based on the reconfigured desired channel and interference channel information by means of the common/user-specific message beamforming controller 190 at operation 530. Finally, the transmitter 100 transmits the data by applying the $f_d$ beamforming vector (for user-specific message) and $f_c$ beamforming vector (for common message) by means of the beamformer 150 at operation 550.

Figure 6:
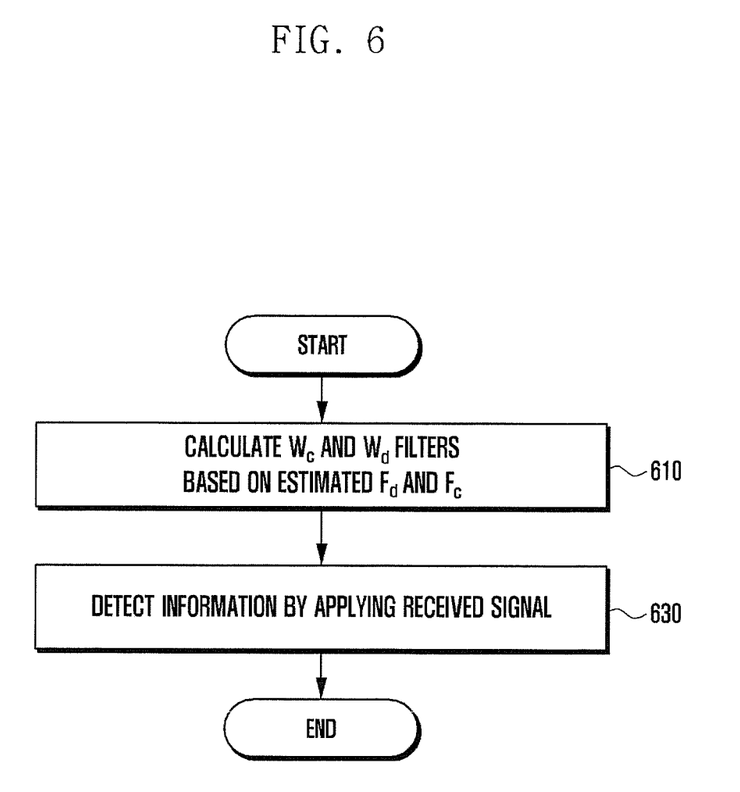
FIG. 6 is a flowchart illustrating a common and user-specific message reception procedure by calculating the reception filter at the receiver according to an embodiment of the present disclosure.

FIG. 6 is a flowchart illustrating a common and user-specific message reception procedure by calculating the reception filter at the receiver according to an embodiment of the present disclosure.

Referring to FIG. 6, the receiver 200 according to an embodiment of the present disclosure may detect the information transmitted by the terminal 200 at operation 550. The terminal 200 calculates the common message reception filter we and the user-specific message reception filter wd based on the $f_d$ beamforming vector for user-specific message and the fc beamforming vector for common-message estimated by means of the post-processing controller 210 at operation 610. The receiver 200 receives the data by means of the reception filter 230 and discriminates between the user-specific message xd and common message xc at operation 630.

The operations of the transmitter and receiver according to an embodiment of the present disclosure have been described hereinabove.

A description is made of the performance of the transceiver according to an embodiment of the present disclosure.

FIGS. 7 to 10 are graphs illustrating the performance of the transceiver according to an embodiment of the present disclosure.

Figure 7:
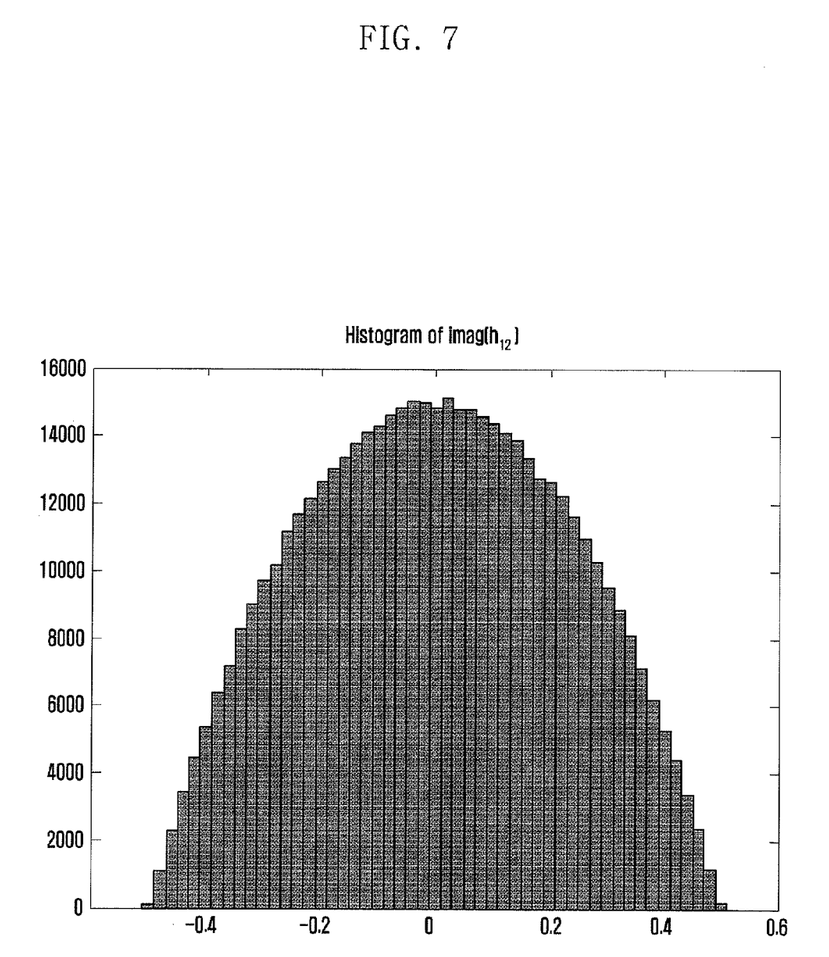
FIGS. 7 to 10 are graphs illustrating the performance of the transceiver according to embodiments of the present disclosure.
Figure 8:
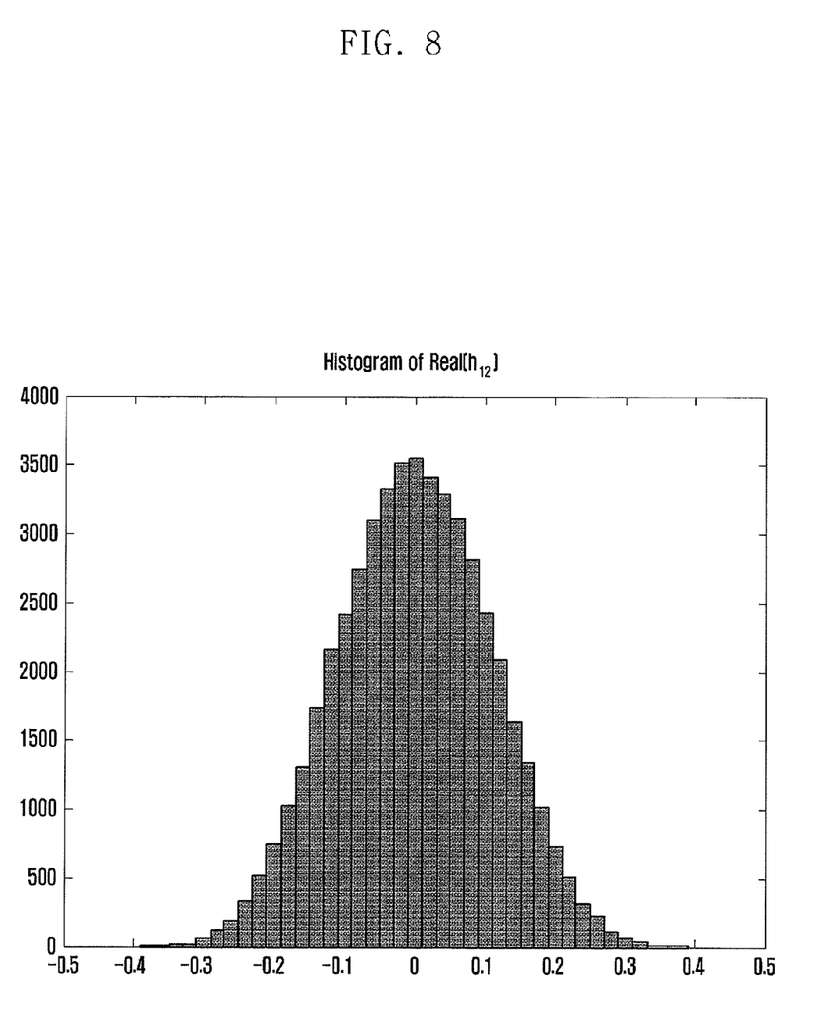

Since the legacy channel feedback aims to transmit channel itself to the transmitter, the Grassmanian codebook or orthogonal codebook is used. However, the aforementioned channel, $H^*_k G_l$, becomes different from the channel H or G in characteristic. FIG. 7 shows the histogram of an element of $H^*_k G_l$ in the case of two receive antennas. As shown in FIG. 7, the histogram concentrates in 0 other than distributed regularly.

Since the legacy channel feedback aims to transmit channel itself to the transmitter, the Grassmanian codebook or orthogonal codebook is used. However, the aforementioned channel, $H^*_k G_l$, becomes different from the channel H or G in characteristic. FIG. 7 shows the histogram of an element of $H^*_k G_l$ in the case of two receive antennas. As shown in FIG. 7, the histogram concentrates in 0 other than distributed regularly.

Figure 9:
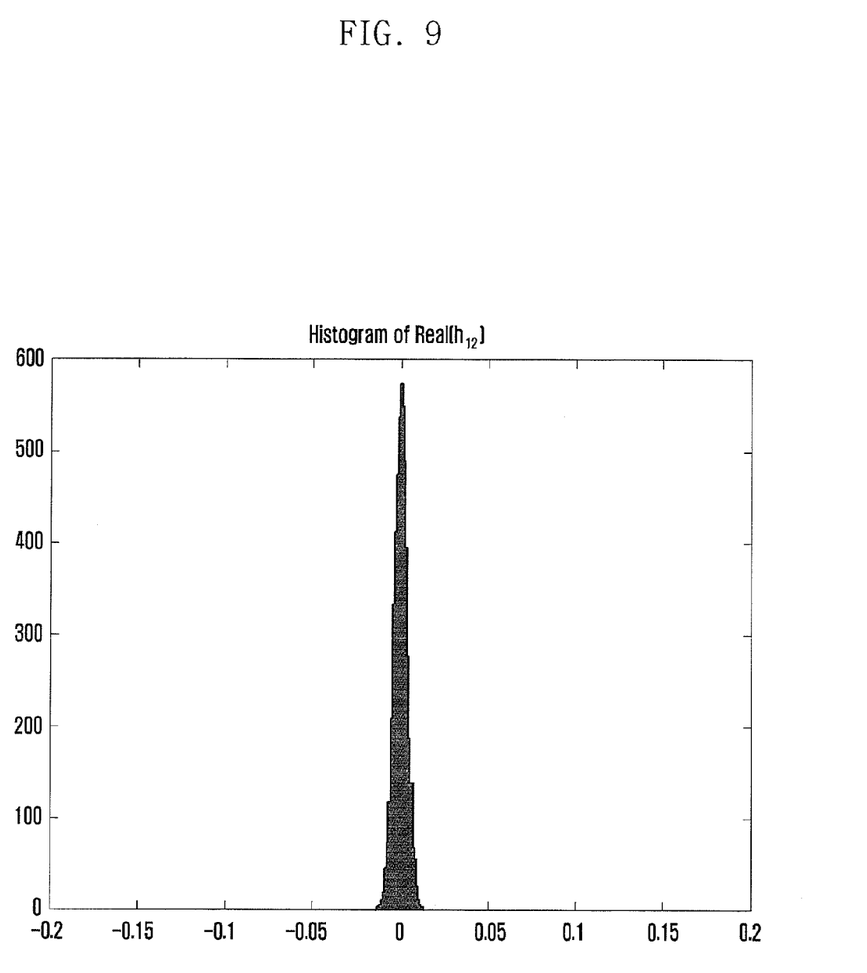

FIG. 9 shows the histogram of an element of $H^*_k G_l$ in the case of 10000 receive antennas. In the case that the number of receive antennas is 10000, the random characteristic decreases as compared to the cases where the numbers of antennas are 2 and 10. Accordingly, if the number of antennas is large enough as in the massive MIMO, the use of legacy feedback method may degrade the performance.

Figure 10:
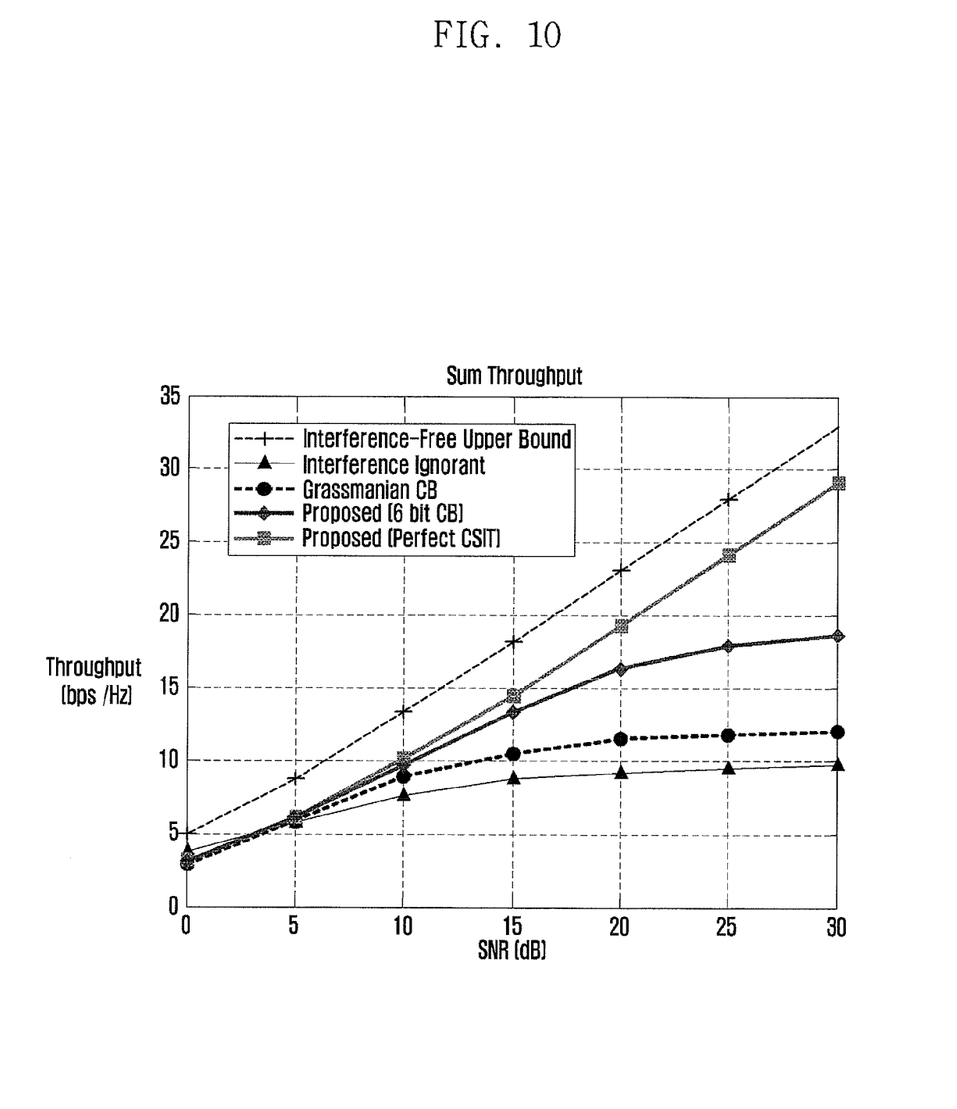

FIG. 10 shows the performance comparison between the communication system of the present disclosure and the legacy system. The graph of FIG. 10 shows the sum rate comparison capable of acquiring by applying the independent beamforming vector to the user-specific message xd and common message xc. The "Interference-Free Upper Bound" denotes the result under the assumption that the interference is cancelled completely and the desired signal is maximized logically. The "Interference Ignorant" denotes the result according to the legacy method of receiving data by processing the interference signal as noise. The "Grassmanian CB" denotes the result when the Grassmanian codebook is used and, in this case, 6-bit codebook is used. The "proposed" denotes the method of the present disclosure, and "Perfect CSIT denotes the result when the codebook size is infinite. The "Proposed 6 bit CB" denotes the result when the 6-bit codebook is used. As shown in FIG. 10, if the number of receive antennas is greater than the number of streams, the communication system according to the present disclosure is superior to the legacy system in performance outstandingly. That is, this comparison result shows that the Grassmanian codebook is not appropriate for the multi-cell environment using a plurality of receive antennas.

Although preferred embodiments of the disclosure have been described using specific terms, the specification and drawings are to be regarded in an illustrative rather than a restrictive sense in order to help understand the present disclosure. It is obvious to those skilled in the art that various modifications and changes can be made thereto without departing from the broader spirit and scope of the disclosure.

As described above, the multi-antenna system of the present disclosure is advantageous in suppressing the interference from other cells and maximizing the gain of the desired signal especially when the number of receive antennas is greater than the reception streams.

Also, the communication method and apparatus of the present disclosure is advantageous in designing a codebook with high performance as compared to the Grassmanian codebook and low complexity in the above environment.

The advantages of the present disclosure are not limited to the aforesaid, and other objects not described herein with be clearly understood by those skilled in the art from the descriptions below.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for receiving signals in a codebook-based multiple antenna system, the method comprising:
   estimating a desired channel and an interference channel;
   determining a codebook index using a first product between a Hermitian of the desired channel and the desired channel and a second product between the Hermitian of the desired channel and the interference channel; and
   feeding back the codebook index to a transmitter.

2. The method of claim 1, further comprising:
   calculating a user-specific message reception filter and a common message reception filter using the Hermitian of the desired channel and the interference channel; and filtering a user-specific message and a common message from the data transmitted by the transmitter.

3. The method of claim 1, further comprising:
estimating a user-specific message beamforming vector and a common message beamforming vector;
calculating a user-specific message reception filter and a common message reception filter using the user-specific message beamforming vector and the common message beamforming vector; and
filtering a user-specific message and a common message from the data transmitted by the transmitter.

4. A method for transmitting a signal in a codebook-based multiple antenna system, the method comprising:
receiving a codebook index from a receiver;
calculating a user-specific message beamforming vector and a common message beamforming vector using a first product between a Hermitian of the desired channel and the desired channel and a second product between the Hermitian of the desired channel and an interference channel based on the codebook index; and
transmitting the data as multiplied with the user-specific beamforming vector and the common message beamforming vector with the data.

5. The method of claim 4, wherein the user-specific beamforming vector is calculated using a generalized eigenvector of the first product between the Hermitian of the desired channel and the desired channel and the second product between the Hermitian of the desired channel and the interference channel.

6. An apparatus for a codebook-based multiple transmission or reception, the apparatus comprises:
a plurality of antennas configured to transmit or receive a signal; and
a controller configured to estimate a desired channel and an interference channel, determine a codebook index using a first product between a Hermitian of the desired channel and the desired channel and a second product between the Hermitian of the desired channel and the interference channel, and feed back the codebook index to a transmitter.

7. The apparatus of claim 6, further comprising:
the controller further configured to calculate a user-specific message reception filter and a common message reception filter using the Hermitian of the desired channel and the interference channel; and
a reception filter is configured to filter a user-specific message and a common message from the data transmitted by the transmitter.

8. The receiver of claim 6, further comprising:
the controller further configured to estimate a user-specific message beamforming vector and a common message beamforming vector and calculate a user-specific message reception filter and a common message reception filter using the user-specific message beamforming vector and the common message beamforming vector; and
a reception filter configured to filter a user-specific message and a common message from the data transmitted by the transmitter.

9. An apparatus for a codebook-based multiple transmission or reception, the apparatus comprising:
a controller configured to receives a codebook index from a receiver, calculate a user-specific message beamforming vector and common message beamforming vector using a first product between a Hermitian of the desired channel and the desired channel and a second product between the Hermitian of the desired channel and an interference channel based on the codebook index and transmit a data as multiplied with the user-specific beamforming vector and the common message beamforming vector with the data, and
an antenna configured to perform at least one of a transmission or reception of a signal.

10. The apparatus of claim 9, wherein the user-specific beamforming vector is calculated using a generalized eigenvector of the first product between the Hermitian of the desired channel and the desired channel and the second product between the Hermitian of the desired channel and the interference channel.

\* \* \* \* \*